[19] United States Patent

Hasuo et al.

[11] 4,380,608

[45] Apr. 19, 1983

[54] PROCESS FOR PRODUCING PROPYLENE-ETHYLENE BLOCK COPOLYMER

[75] Inventors: Masayoshi Hasuo, Yokohama; Yoshinori Suga, Machida; Hisashi Kitada, Yokohama; Yasuo Maruyama, Yokohama; Junichi Gotoh, Yokohama, all of Japan

[73] Assignee: Mitsubishi Chemical Industries, Ltd., Tokyo, Japan

[21] Appl. No.: 347,425

[22] Filed: Feb. 10, 1982

[30] Foreign Application Priority Data

Mar. 6, 1981 [JP] Japan ................................. 56-32216
Apr. 21, 1981 [JP] Japan ................................. 56-60226

[51] Int. Cl.³ ......................................... C08F 297/08
[52] U.S. Cl. ................................. 525/247; 525/53; 525/323
[58] Field of Search ............................. 525/247, 53

[56] References Cited

U.S. PATENT DOCUMENTS 3,732,335  5/1973  Hermans et al. ................ 525/247
4,334,041  6/1982  Zukowski ........................ 525/247

Primary Examiner—Stanford M. Levin
Attorney, Agent, or Firm—Oblon, Fisher, Spivak, McClelland & Maier

[57] ABSTRACT

A propylene-ethylene block copolymer in the presence of a catalyst comprises as main components, a solid titanium-containing catalytic component and an organoaluminum compound having the formula $$AlR_m^1Cl_{3-m}$$

($R^1$ represents a $C_{1-20}$ hydrocarbon moiety; and m is $3 \geq m > 1.5$) by producing a homopolymer of propylene or a propylene-ethylene copolymer by polymerizing propylene or both propylene and ethylene at a vapor phase propylene concentration of 90 mol % or higher based on the sum of propylene and ethylene in a first step and producing a propylene-ethylene block copolymer by copolymerizing propylene and ethylene at a vapor phase propylene concentration of less than 90 mol % based on the sum of propylene and ethylene in the presence of the polymer resulted in the first step and the catalyst in a second step is produced by newly adding an aluminum compound having the formula $$AlR_n^2X_{3-n}$$

($R^2$ represents a $C_{1-20}$ hydrocarbon moiety; X represents a halogen atom and n is $1.5 \geq n \geq 0$) to the components for the copolymerization in the second step.

7 Claims, No Drawings

PROCESS FOR PRODUCING PROPYLENE-ETHYLENE BLOCK COPOLYMER

BACKGROUND OF THE INVENTION

1. Field of the Invention

The present invention relates to a continuous process for producing a propylene-ethylene block copolymer. More particularly, it relates to a continuous process for producing a propylene-ethylene block copolymer having excellent characteristics of cold shortness and high impact strength which are the same or superior to those of a propylene-ethylene block copolymer obtained by a batch system.

2. Description of the Prior Art

It has been well-known to produce a propylene-ethylene block copolymer in order to improve an impact strength and a cold shortness over those of a homopolymer of propylene. In general, propylene is polymerized in the presence of a Ziegler-Natta catalyst composed by an organoaluminum compound and titanium trichloride or a titanium chloride supported by a magnesium compound in an inert liquid hydrocarbon or liquid propylene as a diluent in the first step; and copolymerizing propylene with ethylene in the presence of the propylene polymer produced in the first step to produce a block copolymer in the second step.

The polymerization process can be a batch process and a continuous process. The batch process causes certain disadvantages because of relatively low productivity and economical disadvantage and indispensable dispersion of qualities of the product in runs of the production. On the other hand, the continuous process does not cause such disadvantages to be advantageous as an industrial process. In view of the quality of the product, the following disadvantages are found.

When the first step and the second step are connected in series in the two step polymerization and propylene is polymerized in the first step and propylene and ethylene are copolymerized in the second step as the continuous process, the resulting block copolymer has inferior cold shortness and impact strength in comparison with those of the batch process and an ultimate elongation is lowered and fish-eyes are formed in the product. As a main reason why such disadvantages are caused, the following reason may be considered.

When two or more reactors are connected in series to polymerize by the continuous process, it is considered to be the complete mixed condition in each reactor and to result in certain distribution of the residence time of the catalyst or the polymer containing the catalyst in each reactor. When the residence time of the catalyst is short, the polymer having relatively low productivity of the polymer per unit of the catalyst (referring to as catalyst efficiency) is produced whereas when the residence time of the catalyst is long, the polymer having relatively high catalyst efficiency is produced. In each reactor, the polymer having low catalyst efficiency and the polymer having high catalyst efficiency are produced. As a result, the formulation of the total polymers has a broad distribution. Even though an average residence time in each reactor is set to give 15% of a content of the propylene-ethylene copolymer (referring to as EPR) in the second step, the resulting block copolymer contains polymer grains having zero % of EPR content and polymer grains having about 100% of EPR content as extreme expression. Among them, the polymer grains having relatively high EPR content do not disperse in the homopolymer of propylene to result in fish-eyes in the product. As a result, it is considered to give inferior cold shortness and impact strength.

Various processes have been proposed to overcome the disadvantages in the continuous polymerization.

The processes using many reactors have been proposed in Japanese Examined Patent Publication No. 25585/1978 and Japanese Unexamined Patent Publication No. 53990/1974. In such processes, a block copolymer having physical properties similar to those of batch process can be obtained, however, it causes higher cost of construction of the apparatus depending upon increase of the reactors to be uneconomical and it causes complicated quality control of the product. It is preferable to reduce a number of the reactors.

The process adding an electron donor in the copolymerization of propylene and ethylene in the second step has been proposed in Japanese Examined Patent Publication No. 19542/1969 and Japanese Unexamined Patent Publication No. 115417/1980. Thus, the process has not been effective according to the studies.

The process for reducing a molecular weight of a propylene-ethylene copolymer in the second step has been proposed in Japanese Unexamined Patent Publication No. 61278/1974. The process causes inferior impact strength of the product according to the studies.

SUMMARY OF THE INVENTION

In accordance with the present invention, it provides a continuous process for producing a propylene-ethylene block copolymer in the presence of a catalyst comprising as main components, a solid titanium-containing catalytic component and an organoaluminum compound having the formula $$AlR_m^1Cl_{3-m}$$

($R^1$ represents a $C_{1-20}$ hydrocarbon moiety; and m is $3 \geq m > 1.5$) by producing a homopolymer of propylene or a propylene-ethylene copolymer by polymerizing propylene or both propylene and ethylene at a vapor phase propylene concentration of 90 mol % or higher based on the sum of propylene and ethylene in a first step and producing a propylene-ethylene block copolymer by copolymerizing propylene and ethylene at a vapor phase propylene concentration of less than 90 mol % based on the sum of propylene and ethylene in the presence of the polymer resulted in the first step, and the catalyst in a second step which is characterized by newly adding an aluminum compound having the formula $$AlR_n^2X_{3-n}$$

($R^2$ represents a $C_{1-20}$ hydrocarbon moiety; X represents a halogen atom and n is $1.5 \geq n \geq 0$) to the components for the copolymerization in the second step.

DETAILED DESCRIPTION OF THE PREFERRED EMBODIMENTS

The reason why the improved effect is attained by the addition of the specific aluminum compound in the second step of the process of the present invention is not clearly found and is considered as follows: The rate decrease with time of the copolymerization of propylene and ethylene in the second step is accelerated by the addition of the specific aluminum compound whereby an amount of relatively larger polymer grains having relatively higher EPR content is reduced. Such effect is resulted by accelerating the rate decrease with time of the copolymerization. The effect of the present invention is not found when only the velocity of the copolymerization is reduced without varying the degree of the rate decrease with time of the copolymerization by adding a poison to the catalyst such as an electron donor or the degree of the rate decrease with time of the copolymerization is reduced by adding an activating agent such as trialkylaluminum as described in the following references.

The process of the present invention will be further illustrated. The catalyst system used in the present invention is obtained by using a solid titanium-containing catalytic component and an organoaluminum compound.

The solid titanium-containing catalytic component can be the conventional support type catalytic component obtained by mixing a solid magnesium compound, a titanium tetrahalide and an electron donor and it is preferably a solid catalytic component made of titanium trichloride as a main component. The solid catalytic component made of titanium trichloride as a main component can be products obtained by reducing titanium tetrachloride with aluminum metal, hydrogen or an organoaluminum compound or grinding the product or mixing or pulverizing the product with an electron donor, and is especially a product having a content of an aluminum component as an atomic ratio of Al to Ti of 0.15 or less preferably 0.1 or less especially 0.02 or less and containing a chelating agent. the content of the chelating agent as a molar ratio of the chelating agent to titanium trichloride is 0.001 or more preferably 0.01 or more. As the typical examples, it is composed of titanium trichloride, an aluminum halide compound having the formula $$AlR_p^3X_{3-p}$$

($R^3$ represents a $C_{1-20}$ hydrocarbon moiety; X represents a halogen atom; and p is $0 \leq p \leq 2$) (atomic ratio of Al to Ti of titanium trichloride of 0.15 or less) and a chelating agent at a molar ratio of the chelating agent to the sum of the aluminum halide compound and titanium trichloride of 0.001 or more, for example, it has the formula $$TiCl_3 \cdot (AlR_p^3X_{3-p})_s \cdot (C)_t$$

($R^3$ represents a $C_{1-20}$ hydrocarbon moiety; X represents a halogen atom; p is $0 \leq p \leq 2$; C represents a chelating agent; s is 0.15 or less; and t is 0.001 or more). Beside the $TiCl_3$ component, $AlR_p^3X_{3-p}$ component and the chelating agent, it is possible to incorporate a small amount of iodine a titanium halide obtained by substituting part or whole of chlorine of $TiCl_3$ by iodine or bromine, an inorganic solid as a support such as $MgCl_2$ and MgO; a polyolefin powder such as polyethylene and polypropylene.

The chelating agent C can be ethers, thioethers, ketones, carboxylic acid esters, amines, carboxylic acid amides and polysiloxanes. It is especially preferable to use ethers or thioethers which can be the compounds having the formula $$R^4-O-R^5 \text{ or } R^4-S-R^5$$

($R^4$ and $R^5$ respectively represent hydrocarbon moieties having 15 or less of carbon atoms).

$AlR_p^3X_{3-p}$ can be $AlCl_3$ or $AlR^3Cl_2$.

The solid titanium trichloride type catalytic complex can be easily produced (a) by precipitating it at 150° C. or lower from a titanium trichloride-containing liquid obtained by dissolving a titanium trichloride in the presence of ether or thioether at 150° C. or lower; or (b) by reducing titanium tetrachloride with an organoaluminum compound or an aluminum metal and treating the resulting titanium trichloride with a chelating agent or a halide compound which are disclosed in Japanese Examined Patent Publication No. 40348/1977, No. 3356/1978, No. 24194/1978, No. 28316/1979, No. 41040/1979, No. 8003/1980, No. 8451/1980, No. 8452/1980 and Japanese Unexamined Patent Publication No. 91794/1977, No. 12796/1978 and No. 116626/1980.

Beside the processes (a) and (b), it is also possible to produce it by reducing titanium tetrachloride with an organoaluminum compound, and adding the ether to the resulting titanium trichloride at a molar ratio of the ether to $TiCl_3$ of 0.5-5 and heating it at 50°-120° C. and separating the resulting solid as disclosed in Japanese Examined Patent Publication No. 27871/1979.

On the other hand, the organoaluminum compounds used as a cocatalyst in the first and second step has the formula $$AlR_m^1Cl_{3-m}$$

($R^1$ represents a $C_{1-20}$ hydrocarbon moiety; m is $3 \geq m > 1.5$).

When the solid titanium-containing catalytic component is a support type catalytic component using a solid magnesium compound as a support, it is preferable to $AlR_3^1$ or a mixture of $AlR_3^1$ and $AlR_2^1Cl$.

On the other hand, in the case of the catalytic component made of $TiCl_3$ as a main component, it is preferable to use $AlR_2^1Cl$. It is possible to use diethylaluminum monochloride as $R^1$ is ethyl group and m=2. It is, however, preferable to use the organoaluminum compound $R^1$ is n-propyl or n-hexyl group).

The specific aluminum compound added in the second step has the formula $$AlR_n^2X_{3-n}$$

($R^2$ represents a $C_{1-20}$ hydrocarbon moiety; X represents a halogen atom especially chlorine atom and n is $1.5 \leq n \leq 0$). It is preferable to use $AlR_{1.5}^2Cl_{1.5}$, $AlR^2Cl_2$ or a mixture thereof.

In the typical aluminum compound, $R^2$ can be methyl, ethyl, propyl, isopropyl, butyl, isobutyl, hexyl, octyl, decyl and dodecyl groups. In view of easy availability and easy handling, it is preferable to use ethylaluminum dichloride ($AlEtCl_2$), ethylaluminum sesquichloride ($AlEt_{1.5}Cl_{1.5}$) and a mixture thereof. It is also possible to use $AlCl_3$.

A ratio of the components in the solid titanium-containing catalytic component is usually a molar ratio of Ti:$AlR_m^1Cl_{3-m}$ of 1:1-100 preferably 1:2-40 and a molar ratio of $AlR_m^1Cl_{3-m}$:$AlR_n^2X_{3-n}$ of 1:0.01-0.50 preferably 1:0.03-0.30.

The specific aluminum compound added in the second step can be the aluminum compound itself and also can be a complex of the aluminum compound and an electron donor or a mixture thereof.

The electron donors can be compounds which are capable of forming a complex with the specific aluminum compound such as organic oxygen-containing compounds such as ethers, ketones, carboxylic acid, esters and alcohols, organic sulfur-containing compounds such as thioether, organic nitrogen-containing compounds such as amines and pyridines; organic silicon-containing compounds such as silanol, polysilanol and polysiloxane; and organic phosphorus-containing compounds such as phosphoric esters and phosphorous esters.

Suitable organic oxygen-containing compounds can be diethyl ether, dipropyl ether, dibutyl ether, diamyl ether, dihexyl ether, dioctyl ether, didecyl ether, didodecyl ether, diphenyl ether, anisol, acetone, methyl ethyl ketone, methyl methacrylate, ethyl methacrylate, methyl benzoate, ethyl benzoate, phenyl acetate, methanol, ethanol and butanol.

Suitable organic sulfur-containing compounds can be diethyl thioether, dipropyl thioether, dibutyl thioether, diamyl thioether, dihexyl thioether, dioctyl thioether and diphenyl thioether.

Suitable organic nitrogen-containing compounds can be triethylamine, tripropylamine, tributylamine, trioctylamine, aniline and pyridine.

Suitable organic silicon-containing compounds can be diphenylsilane diol, triphenylsilanol, trimethylsilanol, dimethylpolysiloxane, and diphenylpolysiloxane.

Suitable organic phosphorus-containing compounds can be triethyl phosphite, triphenyl phosphite, triphenyl phosphine oxide and triphenyl phosphine.

It is especially preferable to use an ether, a thioether or a carboxylic acid ester among them.

An amount of the electron donor is not critical and is usually in a range of 0.1 to 5 mol. per mol. of the specific aluminum compound.

The specific aluminum and the electron donor are preferably premixed in an inert hydrocarbon solvent and the resulting complex or mixture is fed in the second step. The condition of the mixing, the temperature and time for the mixing is not critical.

In the process of the present invention, it is possible to use the catalytic component and the cocatalyst with an electron donor such as carboxylic esters, phosphorous esters and amines as a third component. When the third component is added, the content of third component is selected to be a molar ratio of Ti:third component of 1:0.01–10 preferably 1:0.05–2.

The solid titanium-containing catalytic component used as the catalyst can be used in the polymerization without any treatment. Thus, it is preferable to use it after a pretreatment with a small amount of an olefin such as propylene or ethylene in the presence of an organoaluminum compound. The pretreatment is effective for improving a physical property of a slurry of a polymer such as bulk density.

The pretreatment is carried out at a temperature lower than the polymerization temperature such as 20°–60° C. to give a ratio of the polymer produced in the pretreatment to the solid catalytic component of 0.1–50:1 preferably 1–20:1 by weight.

In the process of the present invention, for producing a propylene-ethylene block copolymer in the presence of a catalyst of the solid titanium-containing catalytic component and the organoaluminum compound as main components, the polymerization is carried out in two steps.

The polymerization can be carried out in an inert hydrocarbon diluent such as propane, butane, hexane, heptane, benzene and toluene or also in liquid propylene or in a vapor phase polymerization.

In the first step, a homopolymerization of propylene or a copolymerization of propylene and ethylene at a vapor phase propylene concentration of 90 mol % or more (propylene/sum of propylene and ethylene) (hereinafter referring to as a homopolymerization of propylene) is carried out in the presence of the solid titanium-containing catalytic component and the organoaluminum compound having the formula

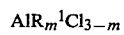
$$AlR_m^1Cl_{3-m}$$

In general, the polymerization temperature and time are selected to give a ratio of the homopolymer of propylene to the final polymer products ranging from 70 to 95 wt.%. The polymerization temperature is usually in a range of 40° to 100° C. preferably 50° to 80° C. The polymerization temperature and a content of a molecular weight controlling agent are selected to give 1–150 of a melt flow index (referring to as MFI) of the homopolymer of propylene obtained in the first step.

The molecular weight controlling agent can be hydrogen and dialkylzinc and preferably hydrogen. A concentration of hydrogen in the vapor phase (concentration of hydrogen to sum of propylene and ethylene) is usually in a range of about 1–30 mol %.

In the second step, a copolymerization of propylene and ethylene is carried out in the presence of the homopolymer of propylene produced in the first step, the newly added aluminum compound having the formula

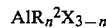
$$AlR_n^2X_{3-n}$$

A concentration of propylene in the vapor phase is less than 90 mol % preferably in a range of 50 to 85 mol % which is the condition for producing a noncrystalline polymer as a by-product at the maximum degree and for improving the impact strength of the final polymer product at the maximum degree. The polymerization temperature and time are usually selected to give 5–30 wt.% of the content of the propylene-ethylene copolymer based on the final polymer product. When the content of the propylene-ethylene copolymer is less than 5 wt.%, the effect for improving the impact strength is small whereas when it is more than 30 wt.%, the product has disadvantageously inferior bulk density and free flowability. The polymerization temperature is usually in a range of 25°–70° C. preferably 25°–65° C. When it is higher than 70° C., the resulting propylene-ethylene block copolymer has inferior free flowability and coagulation of polymer grains is disadvantageously caused. The polymerization temperature and the content of hydrogen as the molecular weight controlling agent are selected to give 0.1 or less of MFI of the propylene-ethylene copolymer. The concentration of hydrogen in the vapor phase is usually in a range of 0.5 to 30 mol %. When MFI is more than 0.1, the improvement of the impact strength is not satisfactory whereas when MFI is extremely small such as less than $10^{-7}$, the improvement of the impact strength is high, but the Barus effect in an injection molding is large to disadvantageously deteriorate a dimensional stability. The content of ethylene component in the final polymer product is preferably in a range of 2 to 30 wt.%.

In the continuous system, each different reactor is used for each of the steps. The reactor in the first step is connected in series to the reactor in the second step. In each step, a plurality of reactors can be used. In the first step, the polymerization can be carried out in two reactors which are serially connected.

The invention will be further illustrated by certain Examples and References which are provided herein for purpose of illustration only and are not intended to be limiting in any manner unless otherwise specified.

In the Examples, the measurements are as follows.

A melt flow index MFI (g./10 min.) is measured by ASTM D-1238-70 at 230° C. under a pressure of 2.16 kg. as a rate of the extrusion.

A brittle point temperature $T_b$(°C.) is measured in the direction of flow of a molten resin (MD) and in the perpendicular direction (TD) pursuant to ASTM D-746 by using a specimen obtained by punching a flat sheet having a thickness of 2.0 mm.

A first yield strength YS (kg./cm$^2$) and an ultimate elongation UE(%) are measured by a tensile test of a dumbbel specimen obtained by punching from a pressed sheet having a thickness of 1.0 mm pursuant to ASTM D-638-72. This is measured at 20° C. otherwise specified.

An Izod impact strength (kg.cm/cm) is measured by using a notched rectangular specimen obtained by punching from a pressed sheet having a thickness of 5.0 mm pursuant to ASTM D-256. This is measured at 20° C. otherwise specified.

Fish-eyes are measured by bending a press sheet having a thickness of 1 mm and observing degree of fish-eyes and classifying it by the following rating.

| Rating | Fish-eyes |
|---|---|
| ◎ | substantially none |
| ○ | quite small |
| △ | small |
| X | many |

The stabilizers, the aluminum compounds and the electron donors used in the examples and references are shown as follows.

| Stabilizer | | |
|---|---|---|
| BHT | 2,6-di-t-butyl-p-cresol | |
| Irganox | pentaerythritol tetrakis[3-(4-hydroxy-3,5-di-t-butylphenyl)propionate] (Ciba-Geigy) | |
| Aluminum compound | | |
| TEA | triethylaluminum | $Al(C_2H_5)_3$ |
| DEA | diethylaluminum monochloride | $Al(C_2H_5)_2Cl$ |
| DPA | di-n-propylaluminum monochloride | $Al(n-C_3H_7)_2Cl$ |
| EASC | ethylaluminum sesquichloride | $Al(C_2H_5)_{1.5}Cl_{1.5}$ |
| EADC | ethylaluminum dichloride | $Al(C_2H_5)Cl_2$ |
| PADC | n-propylaluminum dichloride | $Al(n-C_3H_7)Cl_2$ |
| BADC | i-butylaluminum dichloride | $Al(i-C_4H_9)Cl_2$ |
| Electron donor | | |
| DBE | di-n-butyl ether | $(n-C_4H_9)_2O$ |
| DOE | di-n-octyl ether | $(n-C_8H_{17})_2O$ |
| DPE | diphenyl ether | $(C_6H_5)_2O$ |
| DBS | di-n-butyl thioether | $(n-C_4H_9)_2S$ |
| DAE | di-i-amyl ether | $[(CH_3)_2CHCH_2CH_2]_2O$ |
| MMA | methyl methacrylate | $CH_2C(CH_3)COOCH_3$ |
| EtOH | ethanol | $C_2H_5OH$ |

PREPARATION OF CATALYST 1

(A) Preparation of solid titanium trichloride type catalytic complex:

Into a 10 liter autoclave purged with nitrogen, 5.0 l. of n-hexane and 3.0 mol. of titanium tetrachloride were charged and 2.7 mol. of di-n-octyl ether was added. The mixture was stirred at 25° C. and a solution of 1.0 mol. of diethylaluminum monochloride in 0.5 l. of n-hexane was added dropwise to obtain a homogeneous solution of titanium trichloride in n-hexane in greenish black-brown color. The solution of titanium trichloride was heated to 95° C. During the heating, a formation of purple precipitate of titanium trichloride was found. After stirring the reaction mixture at 95° C. for 1 hour, the precipitate was filtered and repeatedly washed with n-hexane to obtain fine powdery solid titanium trichloride type catalytic complex. An elemental analysis showed that the catalytic complex had the formula:

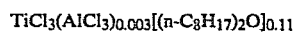

$$TiCl_3(AlCl_3)_{0.003}[(n-C_8H_{17})_2O]_{0.11}$$

(B) Pretreatment with propylene:

Into a 20 liter autoclave purged with nitrogen, 12.5 l. of n-hexane was charged and stirred and 1.6 mol. of di-n-propylaluminum monochloride and the solid titanium trichloride type catalytic complex obtained by the step (A) were charged to give 250 g. of TiCl$_3$ component. Then, the temperature in the autoclave was controlled to 30° C. and propylene gas was fed with stirring at the same temperature until polymerizing 1250 g. of propylene. The resulting precipitate was separated and repeatedly washed with n-hexane to obtain a polypropylene-containing titanium trichloride.

PREPARATION OF CATALYST 2

(A) Preparation of solid titanium trichloride type catalytic complex:

Into a 10 liter autoclave purged with nitrogen, 1.0 l. of n-hexane and 2.0 mol. of titanium tetrachloride were charged and the mixture was cooled to 5° C. and stirred and a solution of 4.0 mol. of ethylaluminum sesquichloride in 2.0 l. of n-hexane was added dropwise during 30 min. After the addition, the reaction mixture was stirred at 5° C. for 2 hours in aging and the resulting precipitate was repeatedly washed with n-hexane to obtain a reddish purple solid product. n-Hexane was added to give 3.0 l. and then 0.42 l. of diisoamyl ether was added to react them at 30° C. for 1 hour while stirring. The resulting precipitate was repeatedly washed with n-hexane and dried under a reduced pressure to obtain a brown product. Then, 8 mol. of titanium tetrachloride was added to the product to react them at 35° C. for 1.5 hours and the precipitate was repeatedly washed with n-hexane to obtain a purple solid titanium trichloride type catalytic complex. An elemental analysis showed that the catalytic complex has the formula:

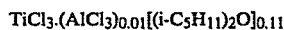

$$TiCl_3.(AlCl_3)_{0.01}[(i-C_5H_{11})_2O]_{0.11}$$

(B) Pretreatment with propylene:

In accordance with the process of Preparation of catalyst 1 (B), the solid titanium trichloride type catalytic complex obtained in the step (A) was pretreated with propylene.

In the specification, "the rate decrease with time" in the present invention means decrease or a phenomenon of decrease of "catalytic activity (polymerization activity of catalyst)" dependent upon time. "The rate decrease with time is high" means rapid reduction of "catalytic activity" for a short time. Acceleration of "the rate decrease with time" means to act to a catalyst to reduce "catalytic activity" for a short time.

EXAMPLE 1

Three reactors equipped with each stirrer which respectively had capacities of 170 l., 70 l. and 60 l. were connected in series and used for a continuous polymerization in two steps. In the first and second reactors, a homopolymerization of propylene was carried out. In the third reactor, a copolymerization of propylene and ethylene was carried out. Into the first reactor, liquid propylene; hydrogen at a content of 5.5 mol % as a vapor phase hydrogen concentration; the titanium trichloride obtained in the step (B) of Preparation of catalyst 1; di-n-propylaluminum monochloride (DPA) at a molar ratio of 8 based on $TiCl_3$; phenyl acetate at a molar ratio of 0.13 based on $TiCl_3$ were charged. A polymerization temperature in the first reactor was 70° C. and an average residence time (polymerizaton time) was 4.5 hours. The reaction mixture discharged from the first reactor was fed into the second reactor and additional liquid propylene and hydrogen at a content of 6 mol % as a vapor phase hydrogen concentration were also continuously fed. A polymerization temperature in the second reactor was 67° C. and an average residence time (polymerization time) was 1.6 hours. The reaction mixture discharged from the second reactor was fed into the third reactor and liquid propylene and ethylene were continuously fed to give 65 mol % of a vapor phase propylene concentration and a vapor phase hydrogen concentration was controlled to be 3 mol %. Ethylaluminum dichloride (EADC) was charged to give a molar ratio of EADC/DPA of 0.08. A polymerization temperature in the third reactor was 45° C. and an average residence time (polymerization time) was 1.5 hours.

The reaction mixture discharged from the third reactor was flushed to purge the unreacted propylene and the polymer obtained by the polymerization was separated as a polymer powder and continuously treated at 120° C. with propylene oxide gas. The resulting powdery product was admixed with 0.1 wt.% of BHT as an additive 0.1 wt.% of Irganox, 0.2 wt.% of dilaurylthiodipropionate and 0.2 wt.% of calcium stearate. The mixture was kneaded at 220° C. by a uniaxial extruding machine having an inner diameter of 40 mm and it was pressed to form a press sheet. Various physical properties of the product were measured. As a result, the fisheyes was not substantially found as ◎ ; MFI was 2.3; the brittle point temperature $T_b$ was $-23.2°$ C.; the ultimate elongation UE was 762%; the first yield strength YS was 265 kg/cm$^2$ and the Izod impact strength was 11.5 kg.cm/cm.

EXAMPLES 2 TO 9

The homopolymerization of propylene was carried out in the first reactor and the second reactor under the same condition set forth in Example 1. Each copolymerization of propylene and ethylene in the third reactor was carried out by feeding each aluminum compound. The kind and amount of the aluminum compound are shown in Table 1. The polymerization condition in the third reactor was varied as shown in Table 1 so as to give the same ratio of the polymer produced in the third reactor. In accordance with the process of Example 1 except said modification, each polymerization and each kneading were carried out to produce each press sheet and various physical properties were measured. The results are shown in Table 1.

REFERENCES 1 TO 4

The homopolymerization of propylene was carried out in the first reactor and the second reactor under the same condition as set forth in Example 1.

In a copolymerization of propylene and ethylene in the third reactor, any additive was not newly added in Reference 1; triethylaluminum (AlEt$_3$) was added in Reference 2; methyl methacrylate (MMA) was added in Reference 3 and ethanol (EtOH) was added in Reference 4 at each content shown in Table 2. Each polymerization condition in the third reactor was varied as shown in Table 2 so as to give the same ratio of the polymer in the third reactor. In accordance with the process of Example 1 except said modification, each polymerization and each kneading were carried out to produce each press sheet and various physical properties were measured. The results are shown in Table 2.

In accordance with the process of the present invention by adding a specific aluminum compound in the copolymerization of propylene and ethylene in the examples and the references, the block copolymers for products having less fish-eyes, low brittle point temperature as improved cold shortness; large ultimate elongation and high impact strength can be obtained.

EXAMPLES 10 TO 14

The reactors equipped with each stirrer used in Example 1 were used for a continuous polymerization in two steps. In the first and second reactors, a homopolymerization of propylene was carried out. In the third reactor, a copolymerization of propylene and ethylene was carried out. Into the first reactor, liquid propylene; hydrogen at a content of 5.5 mol % as a vapor phase hydrogen concentration; the titanium trichloride obtained in the step (B) of Preparation of catalyst 2; diethylaluminum monochloride (DEA) at a molar ratio of 8 based on $TiCl_3$; phenyl acetate at a molar ratio of 0.2 based on $TiCl_3$ were charged. A polymerization temperature in the first reactor was 70° C. and an average residence time (polymerization time) was 4.5 hours in the first reactor. The reaction mixture discharged from the first reactor was fed into the second reactor and additional liquid propylene and hydrogen at a content of 6 mol % as a vapor phase hydrogen concentration was also continuously fed. A polymerization temperature in the second reactor was 67° C. and an average residence time (polymerization time) was 1.6 hours. The reaction mixture discharged from the second reactor was fed into the third reactor and liquid propylene and ethylene were continuously fed to give 65 mol % of a vapor phase propylene concentration and a vapor phase hydrogen concentration was controlled to be 3 mol %. Each aluminum compound was charged. The kind and the amount of the aluminum compound are shown in Table 3. Each polymerization condition in the third reactor is shown in Table 3.

The reaction mixture discharged from the third reactor was flushed to purge the unreacted propylene and the polymer obtained by the polymerization was separated as a polymer powder and continuously treated at 120° C. with propylene oxide gas. The resulting powdery product was admixed with 0.1 wt.% of BHT as an additive 0.1 wt.% of "Irganox: 1010" 0.2 wt.% of dilaurylthiodipropionate and 0.2 wt.% of calcium stearate. The mixture was kneaded at 220° C. by a uniaxial extruding machine having an inner diameter of 40 mm for two times and it was pressed to form a press sheet. Various physical properties of the product were measured. The results are shown in Table 1. In accordance with the process of the present invention, fish-eyes, the brittle point $T_b$, the ultimate elongation UE and the Izod impact strength are remarkably improved.

REFERENCES 5 AND 6

In accordance with the process of Example 1 except varying the condition in the third reactor as shown in Table 2 without varying the conditions in the first and second reactors, each polymerization and each test were carried out. The results are shown in Table 2.

REFERENCES 7 AND 8

Three reactors equipped with each stirrer which respectively had capacities of 170 l., 70 l. and 60 l. were connected in series and a 5 l. vessel was placed between second and third reactors. Three reactors and vessel were used for a continuous polymerization in two steps. In the first and second reactors, a homopolymerization of propylene was carried out as the first step under the same condition for the homopolymerization of propylene in Example 1. The reaction mixture discharged from the second reactor was fed into a 5 l. vessel and AlEtCl$_2$ was charged to give a molar ratio of AlEtCl$_2$/DPA of 0.08 in Reference 7 and 0.16 in Reference 8. A treating temperature in the 5 l. vessel was 67° C. and an average residence time (treating time) was 5 min. The reaction mixture discharged from the vessel was fed into a 60 l. third reactor and liquid propylene and ethylene were continuously fed to carried out a copolymerization of propylene and ethylene as the second step. The propylene concentration, the hydrogen concentration and the polymerization temperature were respectively kept in 65 mol %, 3 mol % and 45° C. the same as those of the copolymerization of propylene and ethylene in Example 1, however, an average residence time (polymerization time) was varied as shown in Table 2.

The reaction mixture discharged from the third reactor was flushed and the product was treated and kneaded as set forth in Example 1 and various physical properties were measured. The results are shown in Table 2.

In comparison with the examples adding AlEtCl$_2$ in the third reactor in the copolymerization of propylene and ethylene in the second step, the fish-eye and the brittle point temperature of the products are inferior in References 7 and 8 reacting AlEtCl$_2$ with a cocatalyst of DPA and adding the reaction product in the third reactor in the copolymerization of propylene and ethylene in the second step. The effect of the addition of AlEtCl$_2$ was not found. In Reference 8, the ratio of the propylene-ethylene copolymer to the final polymer product did not reach to 13-14% as the desired ratio.

In the process of References 7 and 8, only the copolymerization rate in the second step is reduced and the rate decrease with time of the copolymerization is not accelerated. Therefore, the effect of the present invention could not be attained. In the process of the present invention, it is important to add the aluminum compound having the formula $$AlR_n{}^2X_{3-n}$$

directly in the copolymerization in the second step without previous mixing and reaction with a cocatalyst.

TABLE 1

| | Exp. 1 | Exp. 2 | Exp. 3 | Exp. 4 | Exp. 5 |
|---|---|---|---|---|---|
| Third reactor Kind | | | | | |
| $AlR_n^2Cl_{3-n}$ | EADC | EADC | EADC | EADC | EADC |
| $AlR_n^2Cl_{3-n}/AlR_m^1Cl_{3-m}$ (molar ratio) | 0.08 | 0.04 | 0.16 | 0.25 | 0.35 |
| Polymerization temp. (°C.) | 45 | 45 | 45 | 45 | 45 |
| Polymerization time (hr.) | 1.5 | 1.2 | 2.2 | 4.0 | 6.0 |
| Vapor phase hydrogen concentration (mol %) | 3 | 3 | 3 | 2.5 | 2.5 |
| Vapor phase propylene concentration (mol %) | 65 | 65 | 65 | 65 | 65 |
| Ratio of polymer (3rd reactor) to total yield (%) | 13.5 | 13.4 | 13.5 | 13.4 | 11.5 |
| Final Polymer Product | | | | | |
| MFI (g/10 min.) | 2.3 | 2.2 | 2.3 | 2.1 | 2.1 |
| Fish-eye | ◎ | ○ | ◎ | ◎ | ◎ |
| Brittle point temp. (°C.) $T_b$ (MD) | −23.2 | −15.4 | −24.5 | −25.1 | −24.8 |
| Ultimate elongation UE (%) | 762 | 736 | 781 | 776 | 795 |
| First yield strength YS (kg/cm$^2$) | 265 | 263 | 268 | 260 | 275 |
| Izod impact strength (kg · cm/cm) | 11.5 | 11.8 | 10.5 | 12.5 | 10.2 |

TABLE 1'

| | Exp. 6 | Exp. 7 | Exp. 8 | Exp. 9 | Exp. 10 | Exp. 11 | Exp. 12 | Exp. 13 | Exp. 14 |
|---|---|---|---|---|---|---|---|---|---|
| Third reactor Kind | | | | | | | | | |
| $AlR_n^2Cl_{3-n}$ | EASC | EASC | PADC | BADC | EADC | EADC | EASC | EASC | BADC |
| $AlR_n^2Cl_{3-n}/AlR_m^1Cl_{3-m}$ (molar ratio) | 0.08 | 0.35 | 0.10 | 0.10 | 0.08 | 0.16 | 0.08 | 0.20 | 0.08 |
| Polymerization temp. (°C.) | 45 | 45 | 45 | 45 | 45 | 45 | 45 | 45 | 45 |
| Polymerization time (hr.) | 1.3 | 5.5 | 1.5 | 1.5 | 1.5 | 2.2 | 1.5 | 2.3 | 1.5 |
| Vapor phase hydrogen concentration (mol %) | 3 | 2.5 | 3 | 3 | 3 | 3 | 3 | 3 | 3 |
| Vapor phase propylene concentration (mol %) | 65 | 65 | 65 | 65 | 65 | 65 | 65 | 65 | 65 |
| Ratio of polymer (3rd reactor) to total yield (%) | 13.6 | 12.5 | 13.4 | 13.3 | 13.1 | 13.0 | 13.4 | 13.5 | 13.0 |
| Final Polymer Product | | | | | | | | | |
| MFI (g/10 min.) | 2.1 | 2.4 | 2.1 | 2.2 | 2.1 | 2.2 | 2.4 | 2.2 | 1.9 |
| Fish-eye | △ | ◎ | ◎ | ○ | ◎ | ◎ | ○ | ◎ | ○ |

TABLE 1'-continued

|  | Exp. 6 | Exp. 7 | Exp. 8 | Exp. 9 | Exp. 10 | Exp. 11 | Exp. 12 | Exp. 13 | Exp. 14 |
|---|---|---|---|---|---|---|---|---|---|
| Brittle point temp. (°C.) | −12.5 | −20.8 | −22.6 | −18.4 | −21.4 | −25.6 | −14.3 | −18.8 | −17.7 |
| Ultimate elongation UE (%) | 688 | 766 | 758 | 745 | 785 | 780 | 754 | 788 | 775 |
| First yield strength YS (kg/cm$^2$) | 260 | 265 | 262 | 267 | 253 | 254 | 248 | 246 | 262 |
| Izod impact strength (kg · cm/cm) | 12.3 | 10.8 | 11.8 | 10.7 | 11.2 | 12.2 | 13.1 | 12.7 | 9.5 |

TABLE 2

|  | Ref. 1 | Ref. 2 | Ref. 3 | Ref. 4 |
|---|---|---|---|---|
| Third reactor Kind |  |  |  |  |
| AlR$_n^2$Cl$_{3-n}$ | none | TEA | MMA | EtOH |
| AlR$_n^2$Cl$_{3-n}$/AlR$_m^1$Cl$_{3-m}$ (molar ratio) | 0 | 0.2 | 0.2 | 0.2 |
| Polymerization temp. (°C.) | 45 | 45 | 45 | 45 |
| Polymerization time (hr.) | 1.1 | 0.55 | 1.1 | 1.5 |
| Vapor phase hydrogen concentration (mol %) | 3 | 3 | 3 | 3 |
| Vapor phase propylene concentration (mol %) | 65 | 65 | 65 | 65 |
| Ratio of polymer (3rd reactor) to total yield (%) | 13.9 | 13.5 | 13.4 | 13.5 |
| Final Polymer Product |  |  |  |  |
| MFI (g/10 min.) | 2.1 | 2.2 | 2.0 | 2.3 |
| Fish-eye | X | X | X | X |
| Brittle point temp. (°C.) T$_b$ (MD) | −5.1 | −4.7 | −8.5 | −4.2 |
| Ultimate elongation UE (%) | 486 | 426 | 467 | 409 |
| First yield strength YS (kg/cm$^2$) | 263 | 270 | 266 | 264 |
| Izod impact strength (kg · cm/cm) | 9.0 | 8.2 | 8.4 | 9.2 |

TABLE 2'

|  | Ref. 5 | Ref. 6 | Ref. 7 | Ref. 8 |
|---|---|---|---|---|
| Third reactor Kind |  |  |  |  |
| AlR$_n^2$Cl$_{3-n}$ | none | TEA | EADC | EADC |
| AlR$_n^2$Cl$_{3-n}$/AlR$_m^1$Cl$_{3-m}$ (molar ratio) | 0 | 0.2 | 0.08 | 0.16 |
| Polymerization temp. (°C.) | 45 | 45 | 45 | 45 |
| Polymerization time (hr.) | 1.1 | 0.6 | 1.7 | 2.2 |
| Vapor phase hydrogen concentration (mol %) | 3 | 3 | 3 | 3 |
| Vapor phase propylene concentration (mol %) | 65 | 65 | 65 | 65 |
| Ratio of polymer (3rd reactor) to total yield (%) | 13.4 | 13.0 | 13.4 | 8.0 |
| Final Polymer Product |  |  |  |  |
| MFI (g/10 min.) | 2.1 | 2.4 | 2.2 | 3.3 |
| Fish-eye | X | X | X | X |
| Brittle point temp. (°C.) T$_b$ (MD) | −4.6 | −3.8 | −7.5 | −8.6 |
| Ultimate elongation UE (%) | 495 | 415 | 525 | — |
| First yield strength YS (kg/cm$^2$) | 261 | 256 | 255 | — |
| Izod impact strength (kg · cm/cm) | 8.0 | 7.6 | 10.2 | — |

EXAMPLE 15

The homopolymerization of propylene was carried out in the first reactor and the second reactor under the same condition set forth in Example 1. The reaction mixture discharged from the second reactor was fed into the third reactor and liquid propylene and ethylene were continuously fed to give a propylene concentration of 65 mol % in the vapor phase and a hydrogen concentration in the vapor phase was controlled to give 3 mol %. A toluene solution of a complex of aluminum trichloride (AlCl$_3$) and butyl ether (DBE) (1:1) was fed to give a molar ratio of AlCl$_3$/DPA of 0.08. In accordance with the process of Example 1 except said modification, the polymerization and the kneading were carried out to produce a press sheet and various physical properties were measured. The results are shown in Table 3.

EXAMPLES 16 TO 23

The homopolymerization of propylene was carried out in the first reactor and the second reactor under the same condition set forth in Example 1.

Each copolymerization of propylene and ethylene in the third reactor was carried out by feeding a mixture of each aluminum compound and each electron donor. The kinds and the amounts of the aluminum compound and the electron donor are shown in Table 3. The polymerization condition in the third reactor was varied as shown in Table 3 so as to give the same ratio of the polymer produced in the third reactor. In accordance with the process of Example 15, except said modification, each polymerization and each kneading were carried out to produce each press sheet and various physical properties were measured. The results are shown in Table 3.

EXAMPLES 24 TO 28

The reactors equipped with each stirrer used in Example 1 were used for a continuous polymerization in two steps. In the first and second reactors, a homopolymerization of propylene was carried out. In the third reactor, a copolymerization of propylene and ethylene was carried out. Into the first reactor, liquid propylene; hydrogen at a content of 5.5 mol % as a vapor phase hydrogen concentration; the titanium trichloride obtained in the step (B) of Preparation of catalyst 2; diethylaluminum monochloride (DEA) at a molar ratio of 8 based on TiCl$_3$; phenyl acetate at a molar ratio of 0.2 based on TiCl$_3$ were charged. A polymerization temperature in the first reactor was 70° C. and an average residence time (polymerization time) was 4.5 hours in the first reactor. The reaction mixture discharged from the first reactor was fed into the second reactor and additional liquid propylene and hydrogen at a content of 6 mol % as a vapor phase hydrogen concentration were also continuously fed. A polymerization temperature in the second reactor was 67° C. and an average residence time (polymerization time) was 1.6 hours. The reaction mixture discharged from the second reactor was fed into the third reactor and liquid propylene and ethylene were continuously fed to give 65 mol % of a vapor phase propylene concentration and a vapor phase hydrogen concentration was controlled to be 3 mol %. The compounds shown in Table 3 were continuously charged. The kinds and the amounts of the compounds are shown in Table 3. Each polymerization condition in the third reactor is shown in Table 3.

The reaction mixture discharged from the third reactor was flushed to purge the unreacted propylene and the polymer obtained by the polymerization was separated as a polymer powder and continuously treated at 120° C. with propylene oxide gas. The resulting powdery product was admixed with 0.1 wt.% of BHT as an additive 0.1 wt.% of Irganox, 0.2 wt.% of dilaurylthiodipropionate and 0.2 wt.% of calcium stearate. The mixture was kneaded at 220° C. by a uniaxial extruding machine having an inner diameter of 40 mm and it was pressed to form a press sheet. Various physical properties of the product were measured. The results are shown in Table 3. In accordance with the process of the present invention, fish-eyes, the brittle point $T_b$, the ultimate elongation UE and the Izod impact strength are remarkably improved.

TABLE 3

| | Exp. 15 | Exp. 16 | Exp. 17 | Exp. 18 | Exp. 19 |
|---|---|---|---|---|---|
| Third reactor Kind | AlCl₃. | AlCl₃. | AlCl₃. | AlCl₃. | AlCl₃. |
| Electron donor | DBE | DBE | DOE | DOE | DPE |
| (molar ratio) | (1:1) | (1:2) | (1:1) | (1:1) | (1:1) |
| $AlR_n^2Cl_{3-n}/AlR_m^1Cl_{3-m}$ (molar ratio) | 0.08 | 0.05 | 0.15 | 0.25 | 0.35 |
| Polymerization temp. (°C.) | 45 | 45 | 45 | 45 | 45 |
| Polymerization time (hr.) | 1.5 | 1.3 | 2.2 | 4.0 | 6.0 |
| Vapor phase hydrogen concentration (mol %) | 3 | 3 | 3 | 2.5 | 2.5 |
| Vapor phase propylene concentration (mol %) | 65 | 65 | 65 | 65 | 65 |
| Ratio of polymer (3rd reactor) to total yield (%) | 13.6 | 13.5 | 13.6 | 13.7 | 11.5 |
| Final Polymer Product | | | | | |
| MFI (g/10 min.) | 2.2 | 2.5 | 2.7 | 2.5 | 2.6 |
| Fish-eye | ◎ | ○ | ◎ | ◎ | ◎ |
| Brittle point temp. (°C.) $T_b$ (MD) | −21.4 | −17.2 | −25.2 | −24.2 | −25.4 |
| Ultimate elongation UE (%) | 785 | 745 | 788 | 782 | 826 |
| First yield strength YS (kg/cm²) | 267 | 259 | 263 | 254 | 275 |
| Izod impact strength (kg · cm/cm) | 10.8 | 12.8 | 11.2 | 13.4 | 11.9 |

TABLE 3'

| | Exp. 20 | Exp. 21 | Exp. 22 | Exp. 23 | Exp. 24 | Exp. 25 | Exp. 26 | Exp. 27 | Exp. 28 |
|---|---|---|---|---|---|---|---|---|---|
| Third reactor Kind | | | | | | | | | |
| $AlR_n^2Cl_{3-n}$ | AlCl₃. | AlCl₃. | EADC. | EADC. | AlCl₃. | AlCl₃. | AlCl₃. | EADC. | EADC. |
| Electron donor | MMA | DBS | DBE | DBE | DAE | DAE | DAE | DBE | DOE |
| (molar ratio) | (1:2) | (1:1) | (1:0.5) | (1:1) | (1:1) | (1:1) | (1:2) | (1:1) | (1:1) |
| $AlR_n^2Cl_{3-n}/AlR_m^1Cl_{3-m}$ (molar ratio) | 0.08 | 0.35 | 0.10 | 0.10 | 0.06 | 0.15 | 0.06 | 0.18 | 0.06 |
| Polymerization temp. (°C.) | 45 | 45 | 45 | 45 | 45 | 45 | 45 | 45 | 45 |
| Polymerization time (hr.) | 1.2 | 5.5 | 1.5 | 1.5 | 1.5 | 2.2 | 1.5 | 2.2 | 1.5 |
| Vapor phase hydrogen concentration (mol %) | 3 | 2.5 | 3 | 3 | 3 | 3 | 3 | 3 | 3 |
| Vapor phase propylene concentration (mol %) | 65 | 65 | 65 | 65 | 65 | 65 | 65 | 65 | 65 |
| Ratio of polymer (3rd reactor) to total yield (%) | 14.2 | 11.8 | 13.7 | 13.6 | 13.3 | 13.2 | 13.2 | 13.5 | 13.4 |
| Final Polymer Product | | | | | | | | | |
| MFI (g/10 min.) | 2.4 | 2.4 | 2.3 | 2.1 | 2.4 | 2.3 | 2.2 | 2.1 | 2.1 |
| Fish-eye | ○ | ◎ | ◎ | ○ | ◎ | ◎ | ○ | ◎ | ○ |
| Brittle point temp. (°C.) | −14.8 | −22.0 | −20.2 | −17.8 | −22.3 | −23.1 | −15.6 | −21.4 | −14.3 |
| Ultimate elongation UE (%) | 655 | 772 | 748 | 732 | 776 | 775 | 725 | 766 | 752 |
| First yield strength YS (kg/cm²) | 258 | 274 | 258 | 262 | 255 | 259 | 245 | 246 | 258 |
| Izod impact strength (kg · cm/cm) | 13.5 | 9.8 | 11.2 | 11.0 | 10.4 | 11.4 | 14.5 | 11.9 | 9.9 |

We claim:

1. In a continuous process for producing a propylene-ethylene block copolymer in the presence of a catalyst comprising as main components, a solid titanium-containing catalyst component and an organoaluminum compound having the formula $$AlR_m^1Cl_{3-m}$$

($R^1$ represents a $C_{1-20}$ hydrocarbon moiety; and m is $3 \geq m > 1.5$) by producing a homopolymer of propylene or a propylene-ethylene copolymer by polymerizing propylene or both propylene and ethylene at a vapor phase propylene concentration of 90 mol % or higher based on the sum of propylene and ethylene in a first step and producing a propylene-ethylene block copolymer by copolymerizing propylene and ethylene at a vapor phase propylene concentration of less than 90 mol % based on the sum of propylene and ethylene in the presence of the polymer resulting from the first step and the catalyst in a second step, an improvement characterized by newly adding an aluminum compound having the formula $$AlR_n^2X_{3-n}$$

($R^2$ represents a $C_{1-20}$ hydrocarbon moiety; X represents a halogen atom and n is $1.5 \geq n \geq 0$) to the components for the copolymerization in the second step.

2. The process for producing the block copolymer according to claim 1 wherein said solid titanium-containing catalytic component comprises titanium trichloride, an aluminum halide compound having the formula $$AlR^3_p X_{3-p}$$

($R^3$ represents a $C_{1-20}$ hydrocarbon moiety; X represents a halogen atom; and p is $0 \leq p \leq 2$) at an atomic ratio of Al to Ti of titanium trichloride of 0.15 or less; and a chelating agent at a molar ratio of the chelating agent to titanium trichloride of 0.001 or more.

3. The process for producing the block copolymer according to claim 1 wherein said solid titanium-containing catalytic component is obtained by precipitation at 150° C. or lower from a liquid containing titanium trichloride dissolved in the presence of an ether or thioether.

4. The process for producing the block copolymer according to claim 1 wherein said solid titanium-containing catalytic component is obtained by reducing titanium tetrachloride with an organoaluminum compound or aluminum metal and treating the resulting solid titanium trichloride by a chelating agent treatment and a halide treatment.

5. The process for producing the block copolymer according to claim 1 wherein a molar ratio of said aluminum compound added in the second step to said organoaluminum compound used in the first step is in a range of 0.01 to 0.50.

6. The process for producing the block copolymer according to claim 1 wherein said aluminum compound is added in a form of a complex with an electron donor in the second step.

7. The process for producing the block copolymer according to claim 1 wherein said aluminum compound is added in a form of a mixture of said aluminum compound and an electron donor in the second step.

* * * * *